US010310830B2

(12) United States Patent
Zaidi et al.

(10) Patent No.: US 10,310,830 B2
(45) Date of Patent: Jun. 4, 2019

(54) SHADER PROFILER

(71) Applicant: Apple Inc., Cupertino, CA (US)

(72) Inventors: Syed Irfan Zaidi, Cupertino, CA (US);
Sun Tjen Fam, Cupertino, CA (US);
Puyan Lotfi, Cupertino, CA (US);
Venkat R. Indukuru, Cupertino, CA (US); Jun Pan, Cupertino, CA (US);
Andrew M. Sowerby, San Francisco, CA (US); Jean-Luc Duprat, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/617,625

(22) Filed: Jun. 8, 2017

(65) Prior Publication Data

US 2018/0349119 A1 Dec. 6, 2018

Related U.S. Application Data

(60) Provisional application No. 62/514,513, filed on Jun. 2, 2017.

(51) Int. Cl.
| | |
|---|---|
| *G06F 9/44* | (2018.01) |
| *G06F 8/41* | (2018.01) |
| *G06F 9/38* | (2018.01) |
| *G06T 15/00* | (2011.01) |
| *G06F 11/36* | (2006.01) |

(52) U.S. Cl.
CPC .......... *G06F 8/4441* (2013.01); *G06F 9/3855* (2013.01); *G06T 15/005* (2013.01); *G06F 11/3636* (2013.01)

(58) Field of Classification Search
None
See application file for complete search history.

(56) References Cited

U.S. PATENT DOCUMENTS

| 5,835,705 A | 11/1998 | Larsen | |
|---|---|---|---|
| 6,665,821 B1 * | 12/2003 | Miyayama | .......... G06F 11/3636 |
| | | | 714/30 |

(Continued)

OTHER PUBLICATIONS

Moya, Victor, et al. "Shader performance analysis on a modern GPU architecture." Proceedings of the 38th annual IEEE/ACM International Symposium on Microarchitecture. IEEE (Year: 2005).*

(Continued)

*Primary Examiner* — Matthew J Brophy
(74) *Attorney, Agent, or Firm* — Blank Rome LLP (57) ABSTRACT

Systems, methods, and computer readable media to improve the development of image processing intensive programs are described. In general, techniques are disclosed to non-intrusively monitor the run-time performance of shader programs on a graphics processing unit (GPU)—that is, to profile shader program execution. More particularly, the shader profiling comprises of sampling data during the execution of a compiled code on GPU. The execution duration of the sequences of instructions within the code is determined. Subsequently, based relative latency of the instructions within the sequence, the duration time for each binary instruction is determined. The binary instructions are then mapped to source code in order to obtain the amount of time each source code instruction in a shader take to execute per draw call.

20 Claims, 8 Drawing Sheets

(56) References Cited

U.S. PATENT DOCUMENTS

| | | | |
|---|---|---|---|
| 7,095,416 B1* | 8/2006 | Johns | A63F 13/10 |
| | | | 345/522 |
| 7,548,238 B2 | 6/2009 | Berteig | |
| 8,001,531 B1* | 8/2011 | Rideout | G06F 11/3664 |
| | | | 709/217 |
| 8,159,491 B2* | 4/2012 | Capewell | G06T 15/005 |
| | | | 345/426 |
| 8,254,455 B2 | 8/2012 | Wu | |
| 8,296,738 B1* | 10/2012 | Kiel | G06F 11/3624 |
| | | | 717/125 |
| 8,462,166 B2 | 6/2013 | Sowerby | |
| 8,572,573 B2* | 10/2013 | Baliga | G06F 11/3632 |
| | | | 712/244 |
| 8,677,186 B2* | 3/2014 | Maybee | G06F 11/3636 |
| | | | 714/34 |
| 8,769,495 B1 | 7/2014 | Gupta | |
| 9,390,541 B2 | 7/2016 | Hasselgren | |
| 9,406,100 B2 | 8/2016 | Akenine-Moller | |
| 9,483,264 B2* | 11/2016 | Alsup | G06F 9/30145 |
| 2005/0013705 A1 | 1/2005 | Farkas | |
| 2006/0090161 A1 | 4/2006 | Bodas | |
| 2006/0152509 A1* | 7/2006 | Heirich | G06F 11/362 |
| | | | 345/426 |
| 2007/0294681 A1 | 12/2007 | Tuck | |
| 2007/0300231 A1 | 12/2007 | Aguilar | |
| 2008/0222453 A1* | 9/2008 | Bartz | G06F 11/3636 |
| | | | 714/28 |
| 2009/0089014 A1 | 4/2009 | Silyaev | |
| 2009/0189896 A1 | 7/2009 | Jiao | |
| 2010/0135418 A1 | 6/2010 | Zhang | |
| 2010/0149185 A1* | 6/2010 | Capewell | G06F 11/3636 |
| | | | 345/426 |
| 2011/0084965 A1 | 4/2011 | Gould | |
| 2011/0119672 A1 | 5/2011 | Ramaraju | |
| 2011/0289485 A1 | 11/2011 | Mejdrich | |
| 2012/0174077 A1* | 7/2012 | Lindahl | G06F 11/3636 |
| | | | 717/128 |
| 2012/0249564 A1 | 10/2012 | Liu | |
| 2012/0324248 A1 | 12/2012 | Schluessler | |
| 2013/0106881 A1 | 5/2013 | Hendry | |
| 2013/0113801 A1 | 5/2013 | Monson | |
| 2013/0238938 A1* | 9/2013 | Baliga | G06F 11/3632 |
| | | | 714/38.1 |
| 2014/0089699 A1* | 3/2014 | O'Connor | G06F 1/324 |
| | | | 713/322 |
| 2014/0118375 A1 | 5/2014 | Abdalla | |
| 2014/0137131 A1 | 5/2014 | Dheap | |
| 2014/0267345 A1 | 9/2014 | Toth | |
| 2014/0292771 A1 | 10/2014 | Kubisch | |
| 2014/0298301 A1* | 10/2014 | Lindahl | G06F 11/3636 |
| | | | 717/128 |
| 2016/0019130 A1 | 1/2016 | Kruglick | |

OTHER PUBLICATIONS

Stephenson, Mark, etal. "Flexible software profiling of gpu architectures." ACM SIGARCH Computer Architecture News. vol. 43. No. 3. ACM, 2015. (Year: 2015).*

* cited by examiner

SHADER PROFILER

BACKGROUND

This disclosure relates generally to the field of graphics processing. More particularly, but not by way of limitation, this disclosure relates to methods for the non-intrusive monitoring of shader program execution during application development.

Many present-day portable device applications are graphics intensive. To support the needed graphics operations many portable devices incorporate one or more graphics processing units (GPUs). It can be particularly important to optimize shader program performance in such environments as one or a few inefficiently executing shader operations can have a noticeably deleterious effect on a program's overall behavior. For at least these reasons, it is important to obtain accurate quantitative measurements of shader program runtime performance.

As used herein, the terms "shader program" or "shader" refer to programs specifically designed to execute on GPU hardware. Illustrative types of shader programs include vertex, geometry, tessellation (hull and domain) and fragment (or pixel) shaders. While the claimed subject matter is not so limited, vertex, fragment, and compute shaders are supported by Metal—a well-known framework that supports GPU-accelerated advanced 3D graphics rendering and data-parallel computation workloads. In general, vertex shaders provide control over the position and other attributes in scenes involving three-dimensional (3D) models. In particular, vertex shaders transform each vertex's 3D position in virtual space to the corresponding two-dimensional (2D) coordinate at which it will appear on a screen. Output from a vertex shader may be sent directly to a rasterizer or to the next stage in a GPU's pipeline (e.g., a fragment shader). Fragment shaders, also known as pixel shaders, may be used to compute the color and other attributes of each pixel. Fragment shaders may, for example, be used to output a constant color or for the application of lighting values, shadows, specular highlights, and translucency.

SUMMARY

Techniques are disclosed to monitor, profile or characterize the run-time performance of shader programs on a graphics processing unit (GPU). One embodiment discloses a shader profiling technique to identify the amount of time each source code instruction in a Shader takes to execute. In an embodiment, for each draw call, it is determined how much time is spent on each line of the source code. More particularly, in one embodiment, the shader profiling technique discloses providing a GPU time cost and percentage associated with each source line of the shader. This information provides the programmers with the ability to improve the code for a more efficient execution. The programmers can analyze the source code line by line to determine how much time is consumed by each step of their source code.

Embodiments of the disclosure describe collecting sample data in order to perform shader profiling. In one embodiment, a GPU API trace is captured and executed on GPU multiple times until enough samples are generated for shader profiling analysis. During the execution of the code on the GPU, trace packets are generated consisting of an offset value, a schedule time, and an end time for each sequence of instructions (e.g. clause). The trace packets are also associated with a program address buffer, which consists of start and end memory addresses associated with each shader binary program.

Embodiment of the disclosure also describe analyzing the collected sample data in order to determine the cost of execution per source code instruction. In an embodiment, the execution duration for each sequence of instructions (e.g. clause) is determined based on the recorded scheduled time and end time of each sequence. Then, the time duration for each instruction within the sequence is measured based on the relative latency of each instruction within the sequence. The execution duration is normalized to account for the time a sequence is selected but not scheduled. Finally, a mapping is performed to map each binary code instruction to a source code instruction.

DETAILED DESCRIPTION

This disclosure pertains to systems, methods, and computer readable media to improve the development of graphics intensive programs. In general, techniques are disclosed to monitor the run-time performance of shader programs on a graphics processing unit (GPU)—that is, to profile shader program execution. More particularly, and in accordance with one embodiment, GPU-based hardware threads may be configured to run in parallel too, and not interfere with, the execution environment of a GPU during shader program execution. When so configured, the behavior of the GPU while executing a shader program may be monitored and subsequently analyzed to provide the amount of time each source code instruction in a Shader takes to execute.

In the following description, for purposes of explanation, numerous specific details are set forth in order to provide a thorough understanding of the inventive concept. As part of this description, some of this disclosure's drawings represent structures and devices in block diagram form in order to avoid obscuring the operational details of various embodiments. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design, development and implementation of graphics-based software programs and systems.

Figure 1:
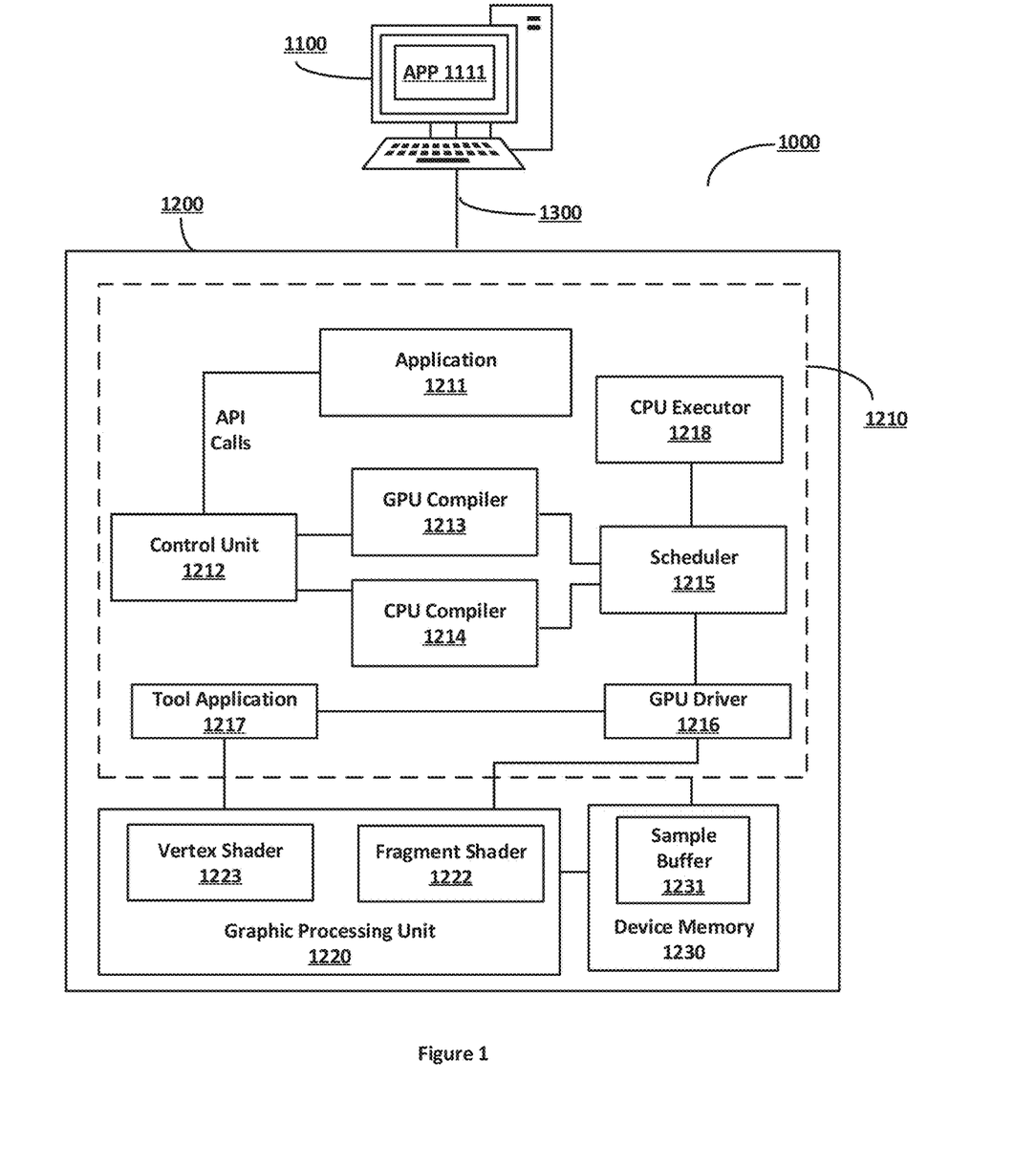
FIG. 1 shows, in block diagram form, a system in accordance with one embodiment.

FIG. 1 demonstrates system 1000, in accordance with one embodiment, including host computer system 1100 executing host-side component application 1111 and computing device 1200 executing device-side component application 1211 coupled through communication link 1300. Host computer 1100 may, for example, be a server, workstation, desktop, laptop, or notebook computer system. Computing device 1200 could, for example, be a smart phone, a laptop, a personal computer, a portable entertainment device or a tablet computer system.

While FIG. 1 in this disclosure describes the implementation of a shader profiling technique with respect to computing device 1200, one skilled in the art will appreciate that the entire shader profiling technique, or at least a portion of it, could also be implemented by host computer system 1100. For example, in an embodiment, host computer 1100 may send groups of one or more instructions to computing device 1200. Computing device 1200 may execute these instruction on its GPU 1220 and return run-time results to host computer 1100. Finally, host computer 1100 may analyze the run-time data and return shader profiling results.

Referring back to FIG. 1, computing device 1200 includes one or more data processing units. For example, computing device 1200 may include a central processing unit (CPU) 1210 and a graphic processing unit (GPU) 1220. GPU 1220 may comprise multiple cores or processing elements designed for executing the same instruction on parallel data streams, making it more effective than general-purpose CPUs for algorithms in which processing of large blocks of data is done in parallel. Communication link 1300 may employ any desired technology, wired or wireless.

Host-side component application 1111 may be a single application, program, or code module or it may be embodied in a number of separate program modules. Likewise, device-side component application 1211 may be embodied in one or more modules. For example, the application 1211 may be a graphic application conveying description of a graphic scene by invoking application programming interface (API) calls to control unit 1212 in order to render an image for display. APIs are developed by vendors and standards organizations to make graphic data-parallel tasks easier to program.

The application 1211 may be written in any programming language such as C, C++, Java, Fortran, and MatLab. The operations demanded by the application 1211 are then interpreted by the control unit 1212 for execution. In an embodiment, the control unit 1212 may map the API calls to functions and operations that are understood by the computing device 1200. Subsequently, the source code is communicated to the compilers 1213 and 1214 to generate binary code for execution on the GPU 1220 and CPU Executor 1218. More specifically, the GPU compiler 1213 produces the compiled program, also referred as shader program or shader binary, which is executable on the GPU 1220.

The scheduler 1215 arranges for the execution of the sequences of compiled programs on the corresponding processing units. GPU driver 1216 provides access to GPU resources such as GPU shader engines (e.g. shader engines 1222 and 1223). Each shader engine executes instructions in the shading program to perform image rendering operations. In an embodiment according to FIG. 1, exemplary shader engines Vertex Shader 1223 and Fragment Shader 1222 are illustrated. In an embodiment, Vertex Shader 1223 handles the processing of individual vertices and vertex attribute data. Fragment Shader 1222 processes a fragment generated by the rasterization into a set of colors and a single depth value. In an embodiment, a frame of the graphic data rendered by shader engines are stored in a frame buffer for display (not shown).

In an embodiment, tool application 1217 communicates with GPU driver 1216 in order to determine resources available for collecting sample data during the execution of a shader program by GPU 1220. In an embodiment, the data collected for shader profiling purposes may be stored in sample buffer 1231 as explained in further detail below. In an embodiment, sample buffer 1231 is part of the device memory 1230 but could also be an on-chip memory on GPU 1220.

Figure 2:
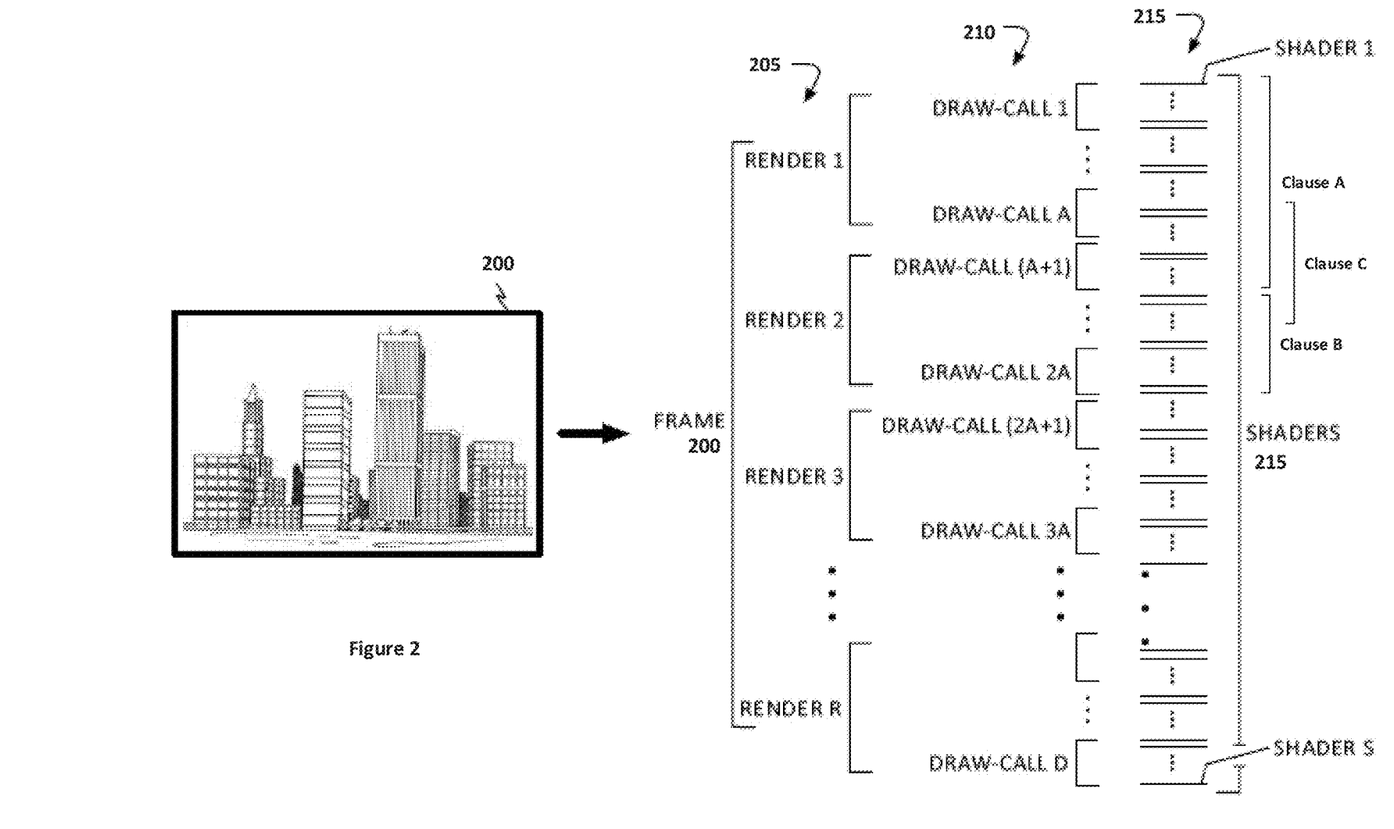
FIG. 2 shows, the break-down of a frame into render phases, draw-calls, and shader programs in accordance with one embodiment.

Referring to FIG. 2, illustrative frame 200 is identified, consisting of a plurality of pixels. A quad is a group of threads that run together on the GPU and which share the same shader instruction. Rendering a frame's worth of graphic data is performed in one or more render phases 205, where each render phase includes one or more draw calls 210, and where each draw-call includes one or more shader programs 215. Illustrative frame 200 comprises a sequence of R render phases, D draw calls, and S shader programs where each draw-call includes a number of shader programs. For illustrative purposes only, each draw-call will be taken to consist of two shader programs: a vertex shader followed by a fragment/pixel shader. One of ordinary skill in the art will recognize and understand that a draw-call in any given implementation may consist of fewer or more shader programs and, in some embodiments, may even vary from draw-call to draw-call. One of ordinary skill in the art will also recognize that each source line can map to multiple binary instructions, and one binary instruction can map to multiple source lines.

Figure 3:
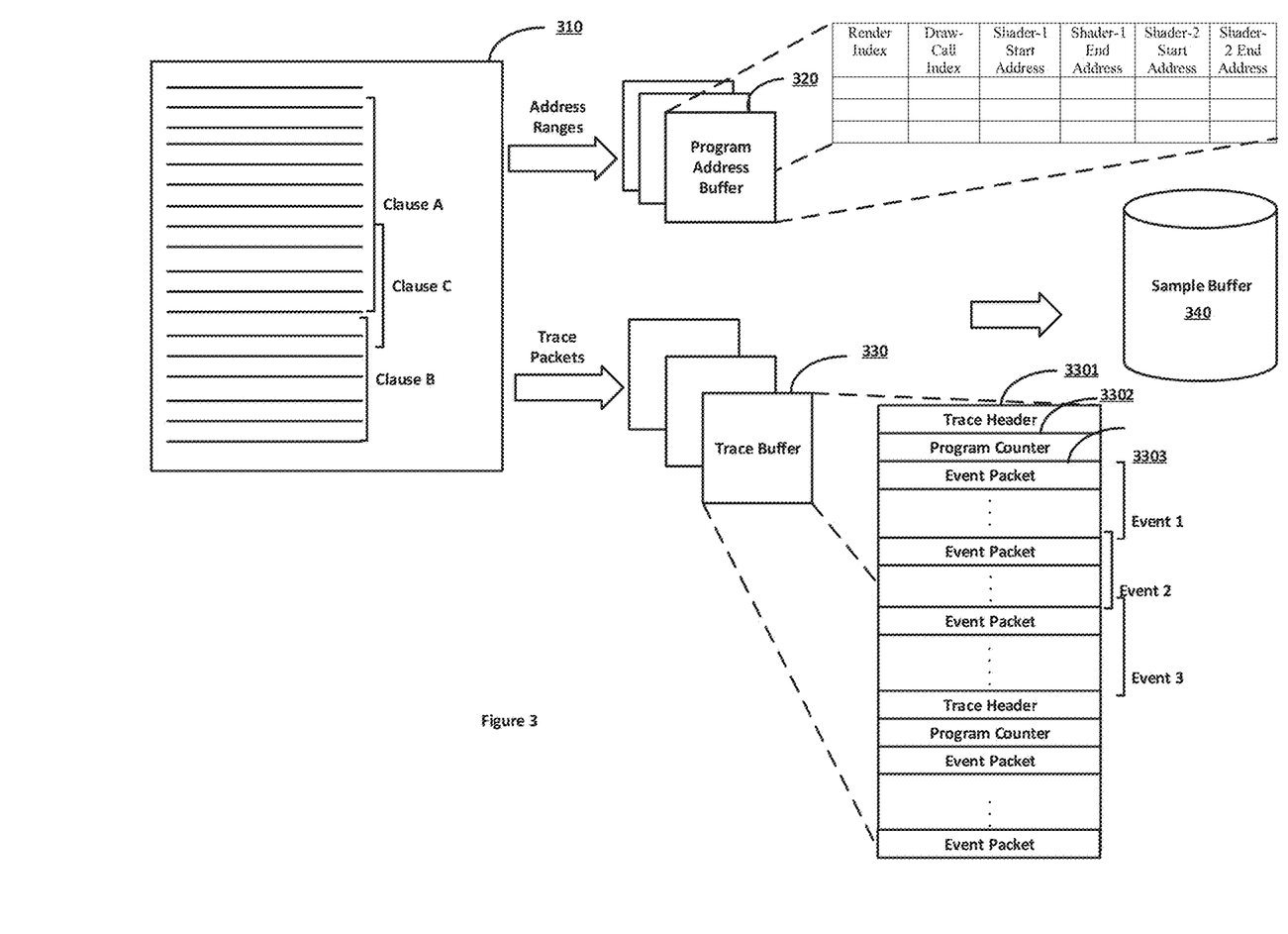
FIG. 3 shows a block diagram for a data sampling operation in accordance with one embodiment.

In an embodiment, the shader profiling relies on scheduling of quads to track lifetimes of clauses executing on quads. Referring to FIG. 3, in an embodiment, GPU driver generates an entry in program address buffer 320 by duplicating shader binary at a new address. When the shader program is executed, the trace buffer 330 contains entries associated with the entry in program address buffer 320. For example, the trace buffer 330 may contain a program counter with a value that falls within the start to end range of the entry in program address buffer 320. Trace buffer 330 consists of timestamp information of when each sequence of instructions is scheduled, started execution and ended execution. Program address buffer 320 retains address ranges representing the start and end of a binary shader in memory.

The shader program 310 may consist of one or more clauses, for example, clauses A, B, C as shown. A clause is a sequence of instructions that are guaranteed to execute from the start to end without an interruption. As clauses can have varied number of instructions, a shader instruction may be run under different clauses which overlap with each other in the shader program 310. For example, the shader instructions in clause C overlap at least with some of the instructions in clauses A and B. Multiple clauses can run in parallel on the hardware and hence their start and end times may overlap. Each instruction in a clause may have a different latency when being executed on the hardware.

In an embodiment, a clause may always start at a deterministic offset position in the shader program 310. Therefore, the starting location of the next clause that will be executed may be calculated by adding the length of current clause to the offset of current clause. For example, referring back to FIG. 3, clauses A and B are in a sequence, therefore, to determine the starting point of clause B the offset of clause A is added to the length of clause A.

Tracing is the process of logging information as the GPU progresses in execution of shader program 310. The GPU may record into the trace buffer 330 the logged information regarding important events, data generated, and data used during execution of shader program 310. In an embodiment, the trace buffer 330 has a predetermined size. The logged information may later be used for the shader profiling purposes.

For example, when a particular quad is selected for tracing, a trace packet is stored in the trace buffer 330 and the timestamp is reset. The trace packet may include trace header 3301 information, program counter 3302, and event packet 3303. The trace header 3301 includes some initial information regarding the trace packet. The program counter 3302 contains the offset value of the first clause in the shader binary. Finally, the event packet 3303 contains information regarding the event type, scheduled event time, and end time for that clause. In an embodiment, the information regarding the number of executed clauses is implicitly determined by counting the number of scheduled type events in the trace packets (e.g. event 1, event 2, and event 3 in FIG. 3).

In an embodiment, the sampling buffer may be accompanied by a program address buffer 320. In one or more embodiments, program address buffer 320 contains for each GPU command (i.e. draw call in case of rendering and dispatch in case of compute), the shader binary start and end address. As discussed with reference to FIG. 2, for each draw call there may be two such address ranges, one each for vertex and fragment shader binaries. GPU driver 1216 will map the shader binary at a unique address for a GPU command, in order to avoid the ambiguity of the same shader binary instruction used by multiple GPU commands. Based on the program counter 3302 associated with trace header 3301, it can be determined which draw call executed that shader program instruction. For each GPU command the disclosed tool may also store the shader binary used for that draw call.

In an embodiment, when the trace buffer 330 is full, the data stored in the trace buffer 330 is copied to a larger memory space, sample buffer 340. In an embodiment, the sample buffer 340 contains information from trace buffers from all quads that have been selected for sampling so far. In an embodiment, these quads may use different shaders and may be part of different GPU commands. At the same time, the trace packets are being generated for another quad that is scheduled to be profiled.

In an embodiment, the quad selected for generating trace packets may reach the end of the shader (i.e. the clause in the last event packet that was recorded in trace buffer includes the last instruction of the shader). before the trace buffer 330 is full. In such circumstances, if there is enough space in the trace buffer 330, a new quad can be selected and the generated trace packets are stored in the trace buffer until the trace buffer does not have any more space.

In another embodiment, a branch may be reached while executing the shader program. Upon reaching a branch in the shader binary, a new trace header is placed in the trace buffer 330 to indicate the end of the clause. In an embodiment, after a branch a new header packet will come with a different Program Counter. In an embodiment, if a branch is taken, the quad will be the same as in the last trace header or event packets, however, it may have a different starting program counter due to the branch. Therefore, in an embodiment, the trace buffer 330 may contain a varied number of trace header packets, followed by varied number of trace event packets.

Data stored in the sample buffer 340 can be used to identify the amount of time each source code instruction in a Shader takes to execute. In an embodiment, for each draw call it is determined how much time is spent on each line of the source code. More particularly, in one embodiment, the disclosed shader profiling operation provides an associated GPU time cost and percentage for each source line of the shader. This information provides programmers with an opportunity to improve their code to be executed more efficiently. The programmers can analyze the source code line by line to determine how much time is consumed by each step of their source code.

Figure 4:
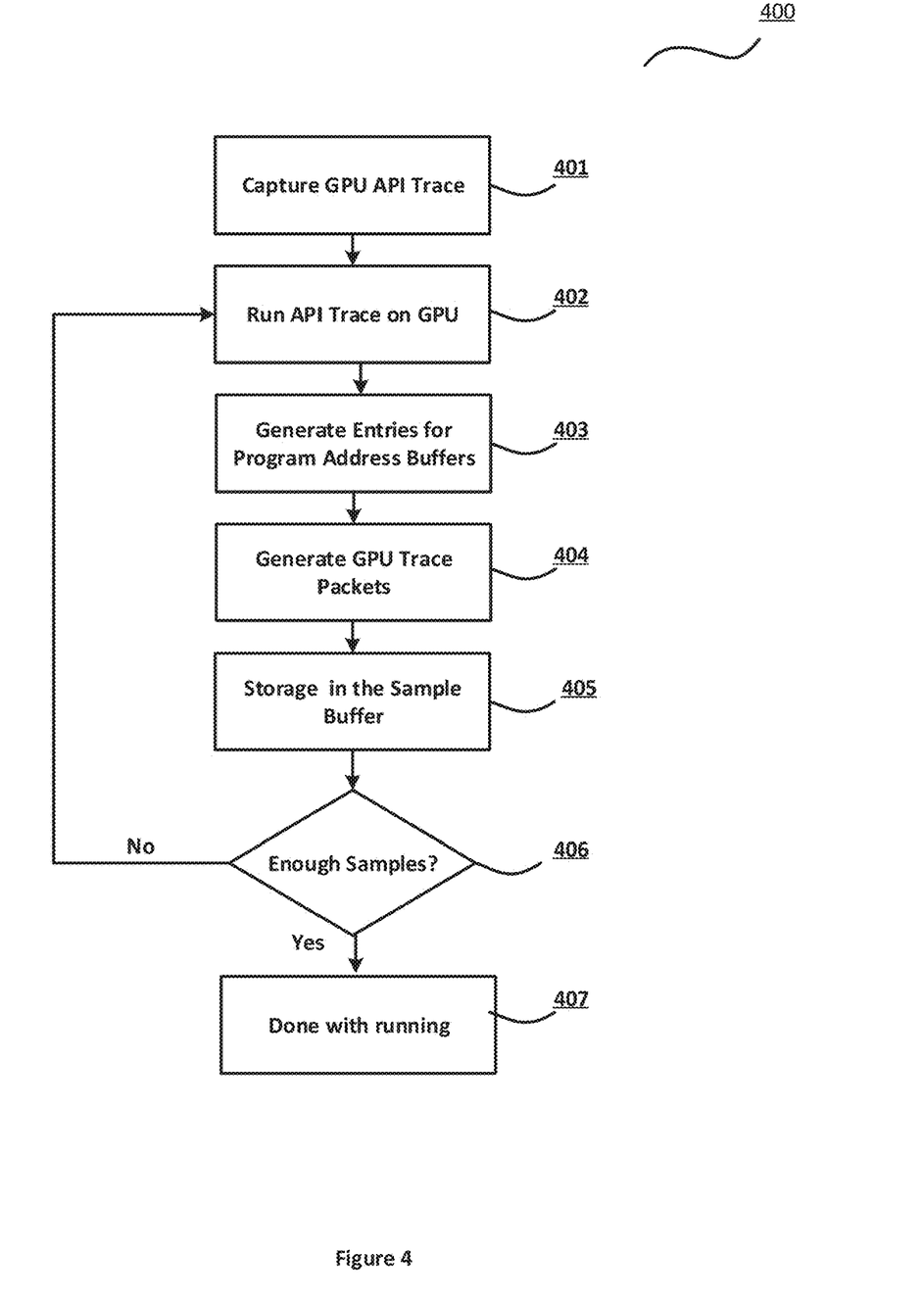
FIG. 4 shows, in flowchart form, an operation to collect data for shader profiling analysis in accordance with one embodiment.

Referring to FIG. 4, in an embodiment, a sampling data method for shader profiling is disclosed according to flowchart 400. At block 401, the GPU API trace of an application subject to shader profiling is captured. By "captured" it is meant that all of the instructions and, in one embodiment, Metal state to render a complete frame are identified and isolated. For example, the system may use a GPU frame debugger to capture the GPU API trace. Then, at block 402, the captured API trace is run on the GPU. In an embodiment, the captured API trace is repeatedly replayed on the GPU, for example, by a replayer application, to generate enough samples. At block 403, entries are generated to be stored in program address buffers. In an embodiment, the program address buffer entries are generated while replaying the captured API trace at block 402. The program address buffer entries may contain start and end values representing each shader binary program's start and end instruction addresses in the memory. The trace packet header may have program counter that falls in the range of a program address buffer entry. In an embodiment, the driver duplicates the shader binary at a different starting program address for each GPU command (e.g. draw call/dispatch call) and stores that information in the program address buffer as a new program address buffer entry.

In an embodiment, the program address buffers may contain, for each shader program, its corresponding render index, draw-call index, start address, and end address. In an embodiment, the start and end addresses refer to locations in memory at which the shader programs are stored and from which they are executed by the GPU. Because multiple draw-calls may use a single shader, each use may be given its own address range so that the captured sampling information may be used to determine the appropriate draw-call.

At block 404, trace packets are generated containing information about the execution of the API trace on the GPU. In an embodiment, this information is later used for shader profiling purposes. In an embodiment, the trace packets contain information such as the program counter of the first sequence of instructions (e.g. clause) in the shader and also timestamp information as to when the clause was scheduled, started and ended.

At block 405, the entries generated for program address buffer at block 403 and their associated content in the trace buffers generated at block 404 are stored in to the sample buffer. In an embodiment, the content is copied into the sample buffer once the trace buffer reaches its full capacity.

In an embodiment, blocks 402 to 405 is repeated for each render index (i.e. encoder) until all encoders are done. An encoder is a collection of some number of draw calls. In an embodiment, GPU driver can associate execution of each encoder with the time that a trace packet was generated. In an embodiment, only draw instructions associated with a specific encoder can place trace packets into trace buffer.

At block 406, a determination is made as to whether the repeated running of the API trace on the GPU has provided enough samples for analysis. For example, at block 407, the replayer could stop after the API trace is run a specified number of times or for a certain amount of time. This will insure that the sample buffer 340 receives enough samples from the driver in order to provide accurate shader profiling results. Referring again to FIG. 1, in an embodiment, the GPU driver 1216 communicates with GPU 1220 and tool application 1217 to provide and store the required data in the sample buffer 340.

Figure 5:
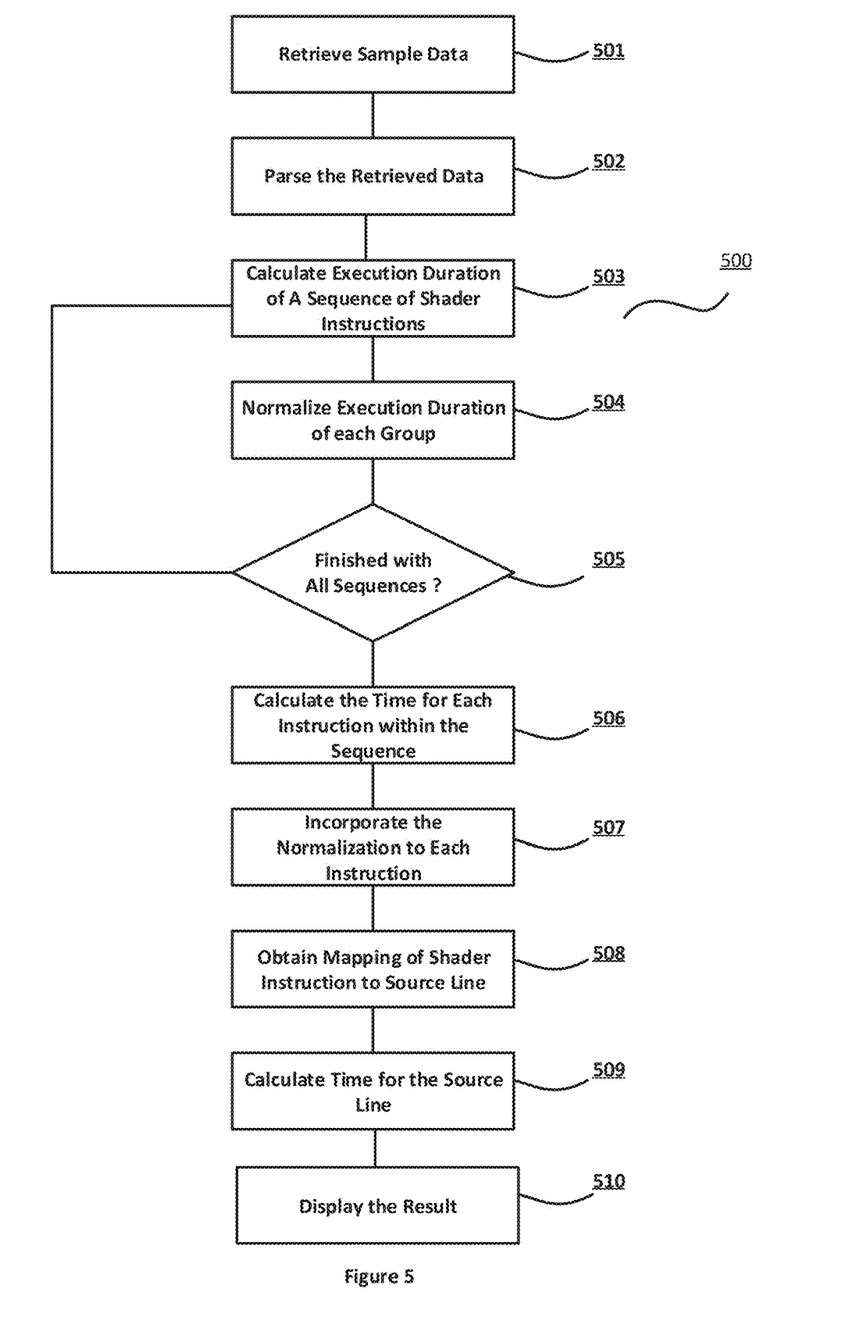
FIG. 5 shows, in flowchart form, an operation for shader profiling analysis of collected data in accordance with one embodiment.

Referring to FIG. 5, in one embodiment, a method of analyzing data for shader profiling is disclosed according to flowchart 500. At block 501, the data collected for shader profiling is retrieved. In an embodiment, the data is sampled in accordance with the method disclosed with respect to FIGS. 3 and 4. In one embodiment, the data is retrieved from sample buffer 340 shown in FIG. 3. In an embodiment, the sample buffer 340 contains execution information associated with multiple quads. The execution information is gathered as a result of tracing GPU activities during the execution of the shader program.

In an embodiment, at block 502, the retrieved data is parsed and decoded. In an embodiment, sequences of instructions that are guaranteed to execute without an interruption are identified and labeled. The labels may identify the timestamp associated with their scheduling, start time and end time.

For example, the desired data may be obtained from the trace header and event packets collected based on the disclosed data collection techniques above. In an embodiment, GPU driver 1216 may append markers in the sample buffer 340 after every trace buffer 330 is copied from the hardware. Then, each trace buffer may be read one at a time. In an embodiment, upon extracting the program counter information from the header packet of the trace buffer, the profile event types and their timestamps are parsed. The event types may include "scheduled event" and "end event" marks. Since the events can overlap on the GPU, the event types can include multiple scheduled events, followed by end events, followed by more scheduled and end events. In an embodiment, a scheduled event mark may be indicative of the beginning of the next clause. Also an end event mark may be indicative of the end of the earliest scheduled clause that has not ended yet.

At block 503, the execution duration for the sequences of uninterrupted instructions identified at block 502 is calculated. At block 502, the scheduling and ending time of each sequence of instructions (e.g. clause) is marked. However, multiple sequences of instructions may run simultaneously for at least a portion of the execution duration. As a result, if the execution costs are attributed based on the start and end times of each clause then the sum of all individual durations exceeds the actual time. Therefore, in order to calculate an accurate execution duration, the overlapping periods of the sequences must be accounted for.

In an embodiment, an execution cost may be defined as the number of GPU clock cycles spent from schedule to end of a sequence of uninterrupted instruction (e.g. clause). In an embodiment, the timestamps which are reset when trace header/program counter is inserted into the trace buffers indicate the number of GPU cycles from the recorded time. For example, a scheduled time of 20 means that the corresponding clause is scheduled after 20 GPU cycles from the time its information was recorded in the trace header. An end time of 100 GPU cycles with only a single clause running at the moment means the execution cost of that clause is 80 GPU clock cycles (100−20=80 GPU clock cycles).

In an embodiment, at block 503, the execution duration of each sequence of instructions (e.g. clause) is calculated in a linear time. In order to account for overlaps in execution of sequences of instructions, the cost is distributed equally among the clauses for the overlapping period. For example, for n clauses running in parallel, we assign 1/n times the cost of the overlapping interval. In other words, for the duration when other clauses run at the same time, that time is distributed among all the active clauses equally. The following formulas summarizes the method of calculating the execution duration according to an embodiment of the disclosure:

$$\text{Time Delta} = \text{Current Event } TimeStamp - \text{Previous Event Time Stamp}$$

$$\text{Time Spent Per Cluase} = \frac{\text{Time Delta}}{\text{Number of Currently Active Cluases}}$$

$$\text{Last Duration} = \text{Time Spent Per Clause} + \text{Last Clause Duration}$$

As shown in the formulas above, in an embodiment, in order to calculate the execution duration of each clause in linear time, each encountered event stores last duration for the current event. Last duration is calculated by incrementing time delta from the last received event timestamp divided by total number of active clauses (1/n) at the time the event arrived. As this last duration increases monotonically, the duration of a clause can be calculated by taking the difference of the last durations calculated at the end and scheduling of the event. The last duration for each time stamp (i.e. current TimeStamp) is based on the last duration as discussed above.

Figure 6:
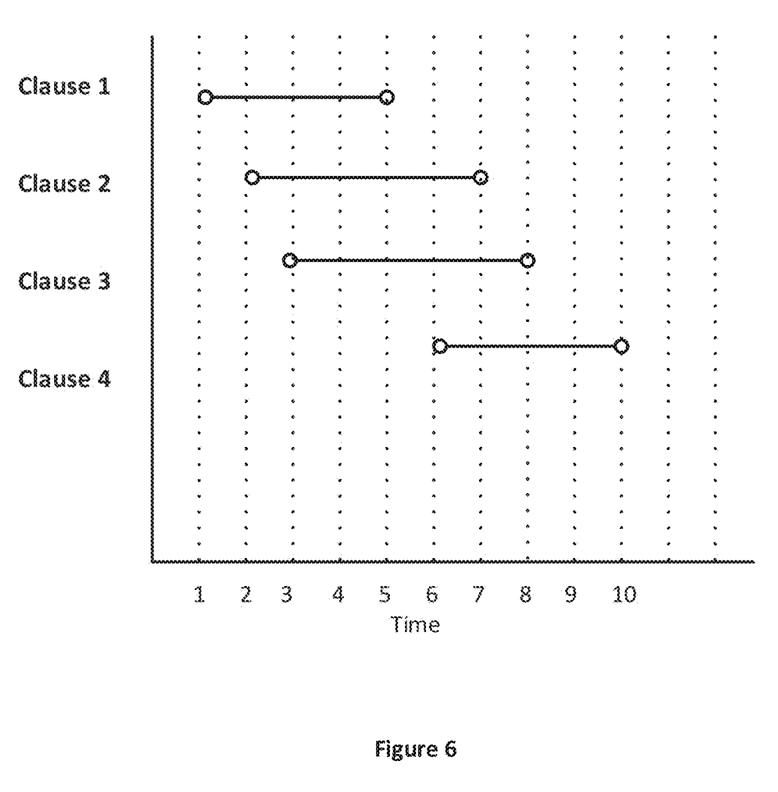
FIG. 6 shows a chart representing overlapping sequences of instructions in accordance with one embodiment.

Referring to FIG. 6, multiple exemplary clauses are illustrated, each overlapping with at least one other clause during their execution. In an embodiment, each subsequent timestamp for an event may always be greater or equal to the previous one (i.e. increasing monotonically). Below, the calculation to determine the execution duration of each clause in the example of FIG. 6 is presented in Table 1. Regarding Clause 1, since there are no "currently active clauses" at TimeStamp 1, the last duration for clause 1 at TimeStamp 1 is zero. The calculations for the rest of the TimeStamp and clauses are made based on the formulas discussed above.

TABLE 1

| | Event | | | | | | |
|---|---|---|---|---|---|---|---|
| | Scheduling C-2 | Scheduling C-3 | End of C-1 | Scheduling C-4 | End of C-2 | End of C-3 | End of C-4 |
| | | | | TimeStamp | | | |
| | at TimeStamp 2 | at TimeStamp 3 | at TimeStamp 5 | at TimeStamp 6 | at TimeStamp 7 | at TimeStamp 8 | at TimeStamp 10 |
| Time Delta | 2 − 1 = 1 | 3 − 2 = 1 | 5 − 3 = 2 | 6 − 5 = 1 | 7 − 6 = 1 | 8 − 7 = 1 | 10 − 8 = 2 |
| Time Per Clause | 1 ÷ 1 = 1 | 1 ÷ 2 = ½ | 2 ÷ 3 = ⅔ | 1 ÷ 2 = ½ | 1 ÷ 3 = ⅓ | 1 ÷ 2 = ½ | 2 ÷ 1 = 2 |
| Last Duration | 0 + 1 = 1 | 1 + ½ = 1½ | 1½ + ⅔ = 2⅙ | 2⅙ + ½ = 2⅔ | 2⅔ + ⅓ = 3 | 3 + ½ = 3½ | 3½ + 2 = 5½ |
| Last Duration for TimeStamp | Timestamp (2) = 1 | Timestamp (3) = 1½ | Timestamp (5) = 2⅙ | Timestamp (6) = 2⅔ | Timestamp (7) = 3 | Timestamp (8) = 3½ | Timestamp (10) = 5½ |
| Duration of Clause | — | — | Clause 1 2⅙ − 0 = 2⅙ | — | Clause 2 3 − 1 = 2 | Clause 3 3½ − 1½ = 2 | Clause 4 5½ − 2⅔ = 2⅚ |

Referring to Table 1 above, the execution duration of clause 1 is calculated to be 2⅙, by subtracting the Last Duration for the TimeStamp at which clause 1 ended (i.e. 2⅙ at TimeStamp 5) from the Last Duration for the Timestamp at which clause 1 was scheduled (i.e. 0 at TimeStamp 1). The execution duration of clause 2 is calculated to be 2, by subtracting the Last Duration for the TimeStamp at which clause 2 ended (i.e. 3 at TimeStamp 7) from the Last Duration for the Timestamp at which clause 2 was scheduled (i.e. 1 at TimeStamp 2). The execution duration of clause 3 is calculated to be 2, by subtracting the Last Duration for the TimeStamp at which clause 3 ended (i.e. 3½ at TimeStamp 8) from the Last Duration for the Timestamp at which clause 3 was scheduled (i.e. 1½ at TimeStamp 2). Lastly, the execution duration of clause 4 is calculated to be 2⅚, by subtracting the Last Duration for the TimeStamp at which clause 4 ended (i.e. 5½ at TimeStamp 10) from the Last Duration for the Timestamp at which clause 4 was scheduled (i.e. 2⅔ at TimeStamp 6).

In the example of FIG. 6, the trace buffer for clauses 1 to 4 may indicate a first event TimeStamp of 1 and last event TimeStamp of 10. The execution time for the four clauses when at least a single clause was active is calculated by subtracting the last event timestamp from first event time stamp (i.e. 10−1=9). The sum of execution time for clauses are given by adding the execution duration of all the clauses (i.e. 2⅙+2+2+2⅚=9).

Referring back to FIG. 5, at block 504, the calculated execution duration for each sequence of instructions (e.g. clause) is normalized. In an embodiment, normalization accounts for the time each sequence of instructions remained on the ready queue before its execution. For example, there may be a period of time between when a sequence of instructions is selected until it is scheduled to be executed. This waiting period must be accounted for in order to determine an accurate execution period for each sequence of instructions.

Figure 7:
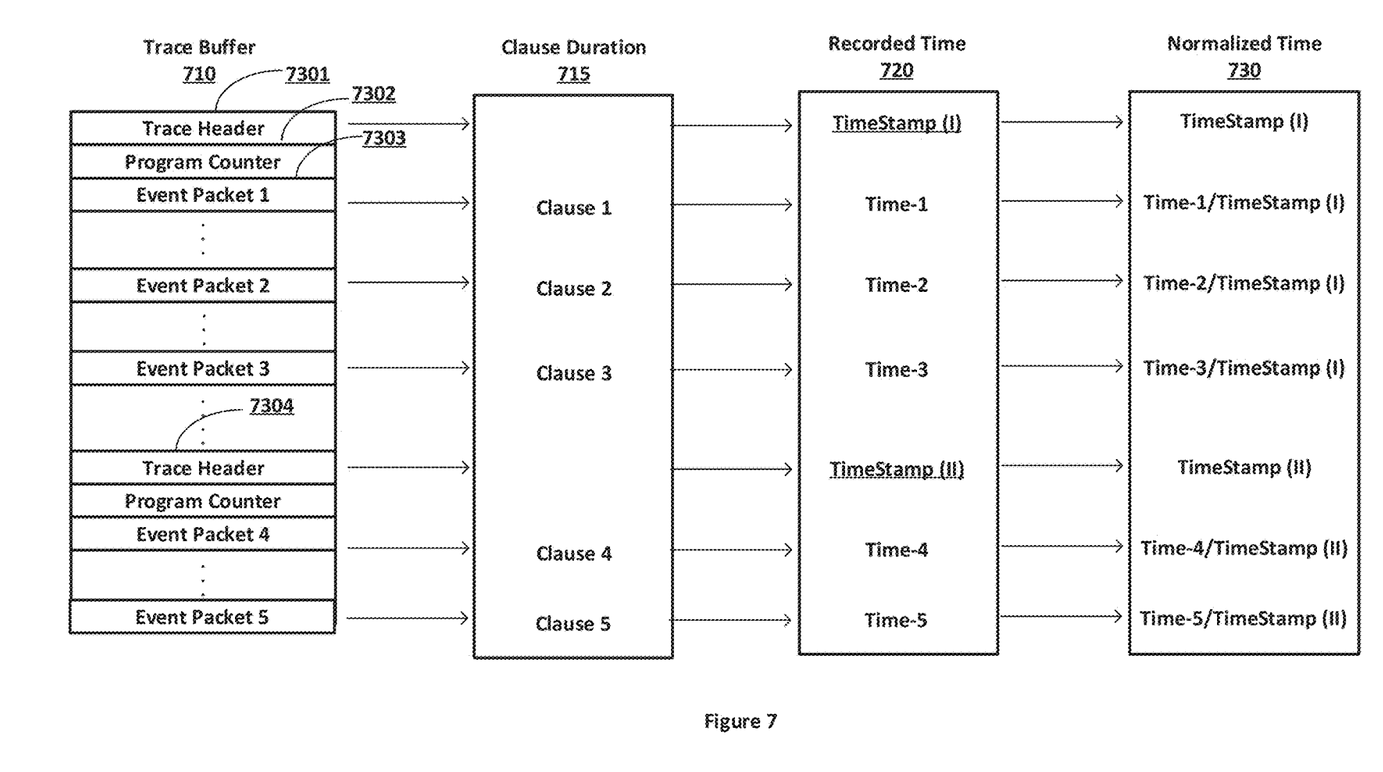
FIG. 7 shows calculation process for normalizing execution duration of a sequence of instructions in accordance with an embodiment.

With reference to a sampling method disclosed above, normalization consists of discounting the amount of time taken for the first clause of a trace header to be scheduled. That is the time duration that the clause is sitting on ready queue waiting to be scheduled (i.e. time spent on a hardware queue waiting for execution). Referring to trace buffer 710 of FIG. 7, to normalize the execution duration of all clauses related to trace header 7301, the duration of every clause is calculated in clause duration chart 715 in accordance with the method disclosed above. The recorded time chart 720 consists of the recorded time (e.g. Time-1, Time-2 and Time-3) and the timestamp (i.e. TimeStamp (I)) for the scheduled events. Finally, the normalized time chart 730 shows that the normalized time is calculated by dividing the recorded time with the timestamp. In an embodiment, if more than one trace header is present in a trace buffer, for example the trace header 7304, and the previous trace header packet is from the same shader as the second trace header 7304, then the same scheduled time (i.e. TimeStamp (I)) is used. On the other hand, if the current trace packet is from a different shader then the scheduled time of the first clause, that shader's timestamp is used for normalizing the duration. For example, Time-4 and Time-5 associated with the event packets 4 and 5 are divided by TimeStamp (II) of the trace header 7304.

Returning to FIG. 5, at block 505, it is determined whether the normalized execution duration for all sampled sequences of instructions (e.g. clauses) have been calculated. If there remains at least one sequence of instructions that has not been analyzed, the method proceeds back to block 503. Upon completion of the analysis on all of the sampled sequences, the method proceeds to block 506.

In an embodiment, the blocks 503 and 504 are repeated for each trace buffer present in the sample buffer until all the trace buffers have been processed. In an embodiment, the described process above may be performed concurrently over a number of available hardware threads on the system and the data structures are kept separate for each thread to store sample information that includes a program counter, duration, clause index (i.e. starting from program counter), program counters of previous trace packets if applicable for normalization purposes. A merge step is then performed to consolidate data from all threads into one single data structure which may then be sorted by the program counter.

At block 506, the time duration for each shader binary instruction sample within a sequence of instructions (e.g. clause) is calculated. In an embodiment, the binary instructions within each sequence of instructions and the execution duration of each sequence of instructions is determined. Then, the relative latency of each instruction within the clause is calculated. Fraction of deterministic latency to sum of deterministic latencies of all instructions within a given clause is relative latency of an instruction for that clause.

Finally, the execution time of the clause present in the sample is distributed proportionally among each contributing instruction based on their relative latency to determine the time duration for each of the instructions.

Figure 8:
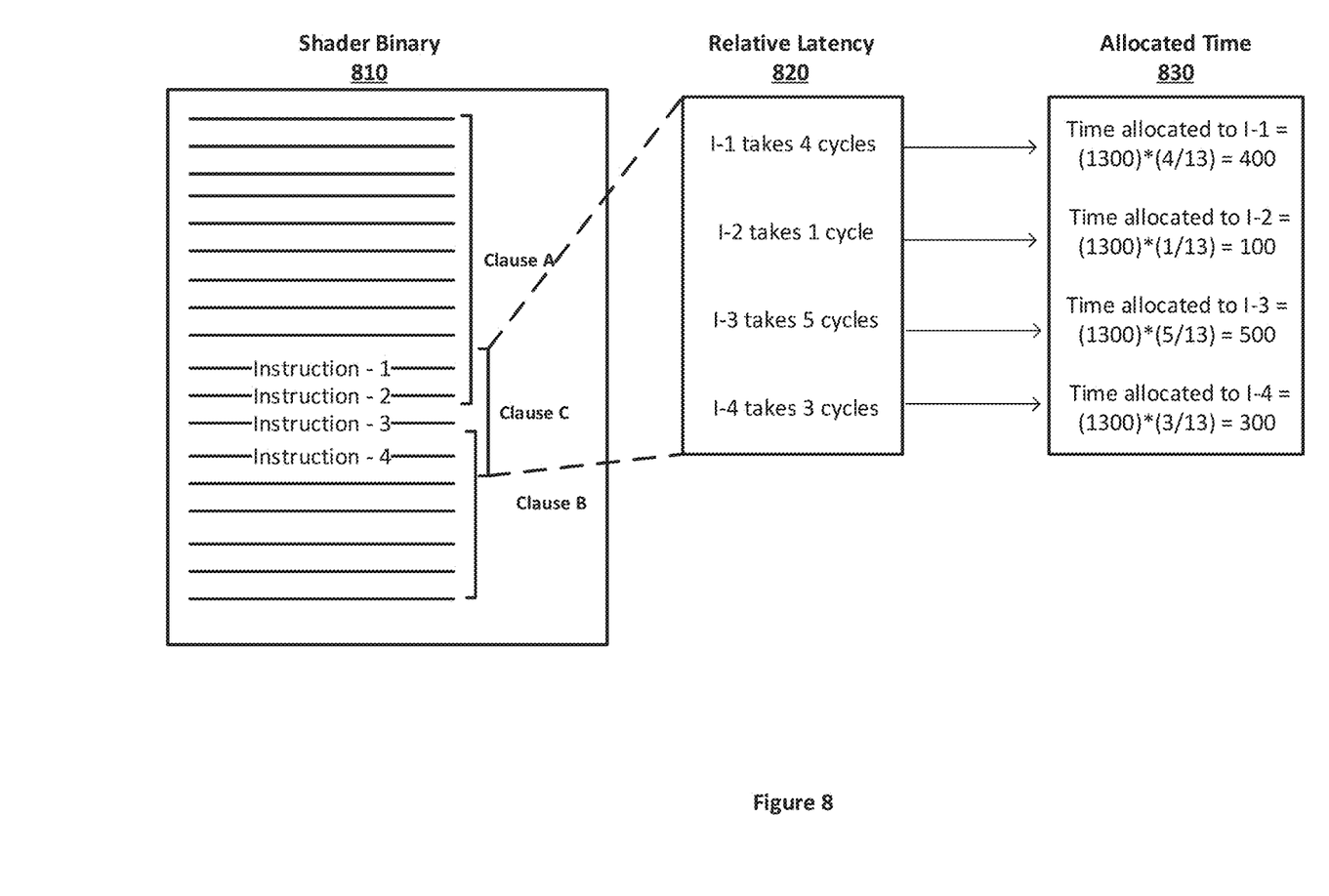
FIG. 8 shows a calculation process for time duration of each instruction in a sequence of instructions in accordance with an embodiment.

For example, referring to FIG. 8, the shader binary 810 may consist of multiple overlapping clauses (e.g. clauses A, B, and C). Clause C may consist of instructions 1, 2, 3, and 4. In one embodiment, the relative latency of each shader binary instruction is calculated (shown in relative latency chart 820). The relative latency may be based on GPU cycles. Then, to calculate the duration time in allocated time chart 830, the execution duration of the clause C, which is given by the previous steps, is distributed proportionally among the instruction lines based on their relative latencies. For example, since instruction 1 of the shader binary 810 took 4 cycles of the entire 13 cycles of clause C, the allocated time for instruction 1 is calculated to be 400 GPU cycles.

In an embodiment, the data is sampled based on the disclosed methods described with reference to FIGS. 3 and 4. As discussed before, in such an embodiment, program address buffer 320 of FIG. 3 contains program address ranges representing the start and end of a binary shader program in memory. In an embodiment, the number of samples within each given program address range is determined. In one embodiment, the number of samples is determined by performing two binary searches over the merged data structure created above (i.e. Block 406 of FIG. 4). In an embodiment, for each program address, the number of samples that were gathered by the hardware are determined in (log of number of total samples)+(number of samples in the program address range) asymptotic time. Therefore, in one embodiment, the total asymptotic time may be determined by (multiplying the number of program addresses times the log of number of samples)+(total number of samples in the sample buffer).

In an embodiment, the offsets of all underlying instructions that make up the clause for a shader binary and the fraction of the time each underlying instruction executes out of the total clause duration may be determined for each sample associated with a currently processed program address range. Since the driver (e.g., GPU driver 1216) maps the shader binary for each separate GPU command in a separate program address, once the samples are found by the two binary searches for each program address range, all the clauses belonging to a particular GPU command may be found.

Referring to FIG. 3, in an embodiment, to determine the offset value of the first clause (i.e. Event 1 in trace buffer 330), the program counter of the sample is subtracted from the program address range (i.e. program counter 3302 is subtracted from begin point in address range). In an embodiment, a helper library may be used to mimic how the hardware converts shader instructions into clauses. For example, the helper library may provide the length of a clause based on a given clause offset value. In an embodiment, the starting point of the next clause is found by adding the size of the clause to the current clause offset. This process is repeated n times for a clause with index n.

In an embodiment, the helper library may also provide the relative latency of each instruction within a clause. The execution duration of a clause present in the sample is distributed proportionally among each contributing instruction based on their relative latency.

Referring to block 507 in FIG. 5, the normalization value calculated at block 504 for each sequence of instructions is incorporated for the binary instructions within the sequence.

In an embodiment, the normalization is determined based on each sample containing program counters of previous trace packets in the same trace buffer. In an embodiment, a per-shader binary instruction sample may be created for each underlying instruction. In an embodiment, the samples may also have information regarding which GPU command issued that shader. The new samples may then be added to a new data structure. In an embodiment, the above process may be done concurrently using the available number of hardware threads and the data consolidated after the processing step.

At block 508 of FIG. 5, the binary address offsets are mapped to source line numbers. In an embodiment, there may be a many-to-many relationship between the binary addresses and source line offsets. In an embodiment, software debugger applications may be used to obtain this mapping information. As each binary instruction can map to 'L' source lines due to many to many relationship, by iterating over each processed sample, the source lines that binary instruction maps to may be determined. The sample duration cost is then distributed by 1/L, where L is the number of source lines mapped by the current binary instruction. After going through all the samples, each source line may have a time duration associated with it. As each sample may also have the information about which GPU command executed it, a per line cost may be determined for each GPU command that executed that source line.

Finally, at block 509, the time generated based on the timestamps assigned by the hardware (e.g., in "GPU cycles" or clock periods) are converted to real GPU time. In an embodiment, the timestamps provide relative costs of all the source lines and GPU commands. However, to obtain the real GPU time, performance counters may be used separately to determine the GPU time spent per GPU command. In an embodiment, this time is distributed proportionally based on per source line cost. After this step each source line has an associated GPU time cost and percentage cost for each source line of the shader.

At block 510, the results are displayed to the user in a user interface. The user interface provides the GPU time cost and percentage cost for each source line of the shader.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In practice, the amount of memory designated to hold run-time sample data may be fixed.

Furthermore, FIGS. 4 and 5 show flowcharts illustrating operations in accordance with the various implementations. In one or more embodiments, one or more of the steps may be omitted, repeated, and/or performed in a different order. Accordingly, the specific arrangement of steps shown in these Figures should not be construed as limiting the scope of the technique. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A program development method, comprising:
obtaining a trace for execution of a compiled shader program, the compiled shader program having a plurality of overlapping instruction sequences, each overlapping instruction sequence having one or more binary instructions, the compiled shader program having a corresponding plurality of source code instructions;

executing the trace a plurality of times to obtain trace packet content for the plurality of overlapping instruction sequences;

identifying an overlapping instruction sequence of the compiled shader program that is uninterrupted during said executing and parsing the trace packet content to determine a time duration for each binary instruction of the identified instruction sequence;

determining an execution duration for the identified instruction sequence based on the parsed trace packet content;

identifying one or more of the source code instructions corresponding to each binary instruction of the identified instruction sequence;

determining a time duration for each of the identified source code instructions of the identified instruction sequence based on the time duration for the identified source code instructions' corresponding binary instruction; and displaying the identified source code instructions and each source code instruction's corresponding time duration.

2. The method of claim 1, wherein determining a time duration for each binary instruction of the identified instruction sequence comprises:

identifying relative latencies among the binary instructions within the identified instruction sequence; and distributing the execution duration among the binary instructions within the identified instruction sequence based on the determined relative latencies.

3. The method of claim 1, further comprising:

determining a number of the overlapping instruction sequences that are executed simultaneously; and distributing an execution cost equally among the determined instruction sequences that are executed simultaneously.

4. The method of claim 1, wherein the trace packet content comprises at least one of:

an offset value of a first sequence of instructions within the compiled shader program;

a scheduled time for execution of the plurality of instruction sequences; and an end time of the execution of the plurality of instruction sequences.

5. The method of claim 4, further comprises:

normalizing the execution duration of the plurality of overlapping instruction sequences based on the scheduled time associated with at least one of the plurality of overlapping instruction sequences.

6. The method of claim 1, further comprises:

determining an address range for each of the plurality of overlapping instruction sequences, the address range indicative of a region of memory in which respective binary instructions were stored during the execution of the trace.

7. The method of claim 6, wherein determining [a] the time duration for each binary instruction of the identified instruction sequence is based on the address range, a scheduled time, and an end time corresponding to the identified instruction sequence.

8. A non-transitory program storage device comprising instructions stored thereon to cause one or more processors to:

obtain a trace for execution of compiled shader program, the compiled shader program having a plurality of overlapping instruction sequences, each overlapping instruction sequence having one or more binary instructions, the compiled shader program having a corresponding plurality of source code instructions;

execute the trace a plurality of times to obtain trace packet content for the plurality of overlapping instruction sequences;

identify an overlapping instruction sequence of the compiled shader program that is uninterrupted when executing the trace and parse the trace packet content to determine a time duration for each binary instruction of the identified instruction sequence;

determine an execution duration for the identified instruction sequence based on the parsed trace packet content;

identify one or more of the source code instructions corresponding to each binary instruction of the identified instruction sequence;

determine a time duration for each of the identified source code instructions of the identified instruction sequence based on the time duration for the identified source code instructions' corresponding binary instruction; and display the identified source code instructions and each source code instruction's corresponding time duration.

9. The non-transitory program storage device of claim 8, wherein the instructions to determine a time duration for each binary instruction of the identified instruction sequence comprise instructions to cause the one or more processors to:

identify relative latencies among the binary instructions within the identified instruction sequence; and distribute the execution duration among the binary instructions within the identified instruction sequence based on the determined relative latencies.

10. The non-transitory program storage device of claim 8, wherein the instructions further cause the one or more processors to:

determine a number of the overlapping instruction sequences that are executed simultaneously; and distribute an execution cost equally among the determined instruction sequences that are executed simultaneously.

11. The non-transitory program storage device of claim 8, wherein the trace packet content comprises at least one of:

an offset value of a first sequence of instructions within the compiled shader program;

a scheduled time for execution of the plurality of instruction sequences; and an end time of the execution of the plurality of instruction sequences.

12. The non-transitory program storage device of claim 11, further comprising instructions to:

normalize the execution duration of the plurality of overlapping instruction sequences based on the scheduled time associated with at least one of the plurality of overlapping instruction sequences.

13. The non-transitory program storage device of claim 8, further comprising instructions to:

determine an address range for each of the plurality of overlapping instruction sequences, the address range indicative of a region of memory in which the respective binary instructions were stored during the execution of the trace.

14. The non-transitory program storage device of claim 13, wherein the instructions to determine the time duration for each binary instruction of the identified instruction sequence is based on the address range, a scheduled time, and an end time corresponding to the identified instruction sequence.

15. A system comprising:
a central processing unit (CPU),
a graphics processing unit (GPU), and
a memory coupled to the device CPU and the GPU, wherein the memory comprises instructions to—
obtain a trace for execution of a compiled shader program having a plurality of overlapping instruction sequences, each overlapping instruction sequence having one or more binary instructions, the compiled shader program having a corresponding plurality of source code instructions;
execute the trace a plurality of times to obtain trace packet content for the plurality of overlapping instruction sequences;
identify an overlapping instruction sequence of the compiled shader program that is uninterrupted during when executing the trace and parse the trace packet content to determine a time duration for each binary instruction of the identified instruction sequence;
determine an execution duration for the identified instruction sequence based on the parsed trace packet content;
identify one or more of the source code instructions corresponding to each binary instruction of the identified instruction sequence;
determine a time duration for each of the identified source code instructions of the identified instruction sequence based on the time duration for the identified source code instructions' corresponding binary instruction; and
display the identified source code instructions and each source code instruction's corresponding time duration.

16. The system of claim 15, wherein the instructions to determine a time duration for each binary instruction of the identified instruction sequence comprise instructions to cause the one or more processors to:
identify relative latencies among the binary instructions within the identified instruction sequence; and
distribute the execution duration among the binary instructions within the identified instruction sequence based on the determined relative latencies.

17. The system of claim 15, wherein the instructions further cause the one or more processors to:
determine a number of the overlapping instruction sequences that are executed simultaneously; and
distribute an execution cost equally among the determined instruction sequences that are executed simultaneously.

18. The system of claim 15, wherein the trace packet content comprises at least one of:
an offset value of a first sequence of instructions within the compiled shader program;
a scheduled time for execution of the plurality of instruction sequences; and
an end time of the execution of the plurality of instruction sequences.

19. The system of claim 15, further comprising instructions to:
normalize the execution duration of the plurality of overlapping instruction sequences based on the scheduled time associated with the at least one of the plurality of overlapping instruction sequences.

20. The system of claim 15, further comprising instructions to:
determine an address range for each of the plurality of overlapping instruction sequences, the address range indicative of a region of memory in which respective binary instructions were stored during the execution of the trace.

* * * * *